Feb. 17, 1948.   W. M. HUTCHISON   2,436,301
PANTOGRAPH AND MOTOR CONTROL SYSTEM
Filed March 18, 1944
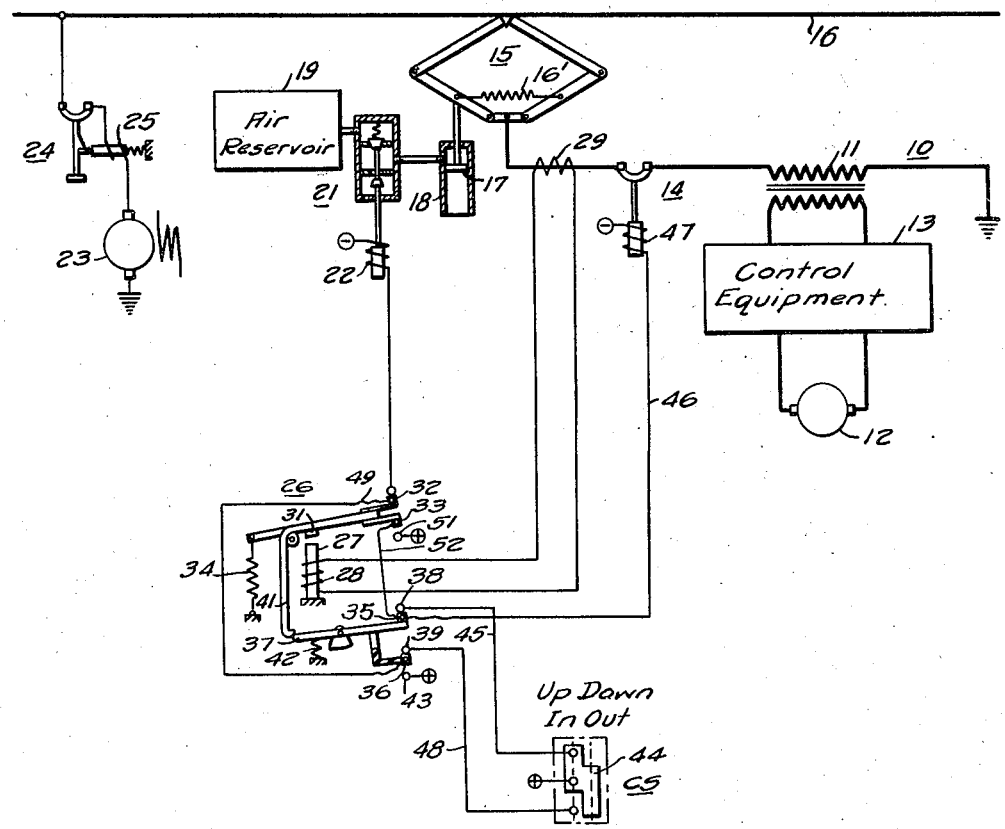
WITNESSES:
INVENTOR
William M. Hutchison.
BY
ATTORNEY Patented Feb. 17, 1948

2,436,301

UNITED STATES PATENT OFFICE 2,436,301

PANTOGRAPH AND MOTOR CONTROL SYSTEM

William M. Hutchison, Pittsburgh, Pa., assignor to Westinghouse Electric Corporation, East Pittsburgh, Pa., a corporation of Pennsylvania Application March 18, 1944, Serial No. 527,127

2 Claims. (Cl. 191—8)

My invention relates, generally, to control systems and apparatus therefor, and, more particularly, to systems and apparatus for controlling the operation of, and protecting the electrical equipment on, electric railway vehicles.

A circuit breaker is provided on electric railway vehicles of certain types to disconnect the electrical apparatus on the vehicle from the pantograph collector which engages the trolley conductor. In view of the limited space on such vehicles, the circuit breaker usually does not have sufficient rupturing capacity to interrupt the current which flows in case of a short circuit in the electrical apparatus. Much consequential damage may result if the circuit breaker fails in the event of an overload. Therefore, it has been the practice to energize the operating coil of the circuit breaker through a time delay relay which functions to cause the breaker to open upon overload only after sufficient time has elapsed to permit the substation circuit breakers to clear the faults. When a fault occurs on the system, the circuit breakers in the nearest substations are opened, thereby isolating the section in which the fault is located.

The foregoing system of operation has the disadvantage inherent in time delay devices which are subject to variation in their timing even with careful maintenance, that is, it requires the maintenance of a differential in time between operation of the substation breakers and the relay. Furthermore, no protection is provided against the lowering of the pantograph by the operator during the interval that a fault exists, which might result in damage to the pantograph and serious burning of the trolley wire.

Accordingly, one object of my invention is to prevent the circuit breaker on a railway vehicle from interrupting an abnormal current.

Another object of my invention is to prevent the lowering of the pantograph on an electric railway vehicle while an abnormal current is flowing in the power circuit or apparatus thereof, or some other predetermined electrical condition of said circuit or apparatus exists.

A further object of my invention is to provide a protective relay capable of performing the functions of a conventional pantograph-lowering relay and a circuit breaker operating relay without having the disadvantage of a time delay feature.

A more general object of my invention is to provide such a protective relay which shall be simple and efficient in operation and which may be economically manufactured and installed.

Other objects of my invention will be explained fully hereinafter or will be apparent to those skilled in the art.

In accordance with one embodiment of my invention, a relay responsive to the current in the apparatus on a railway vehicle is provided with an armature on which two sets of contacts are mounted and which operates against a calibrating spring, and also with two sets of auxiliary contacts which are normally held closed by a latch on the relay armature. Operation of the armature by a predetermined current in the actuating coil releases the latch and causes the auxiliary contacts to assume the tripped position until they are reset manually. The relay contacts are so connected in the control system that the vehicle circuit breaker cannot open in case of a heavy fault current until after a substation breaker has cleared the fault and the pantograph cannot be lowered until the trolley wire is deenergized by operation of the substation breaker.

For a fuller understanding of the nature and objects of my invention, reference may be had to the following detailed description, taken in conjunction with the accompanying drawing, in which the single figure is a diagrammatic view of a control system and protective relay embodying my invention.

Referring to the drawing, the system shown therein comprises a load circuit 10, which includes a transformer 11, a motor 12 and the usual control equipment 13 for controlling the operation of the motor 12, and a circuit breaker 14 for connecting the transformer 11 to a pantograph collector 15 which engages a trolley conductor 16. The pantograph 15 may be of the usual type which is raised by a spring 16' and lowered by a piston 17 disposed in a cylinder 18. The admission of air to the cylinder 18 from an air reservoir 19 may be controlled by a magnet valve 21 which is actuated by a solenoid 22.

In accordance with the usual practice in electric railway systems, the overhead trolley system is divided into sections and the various sections are energized from suitable sources of power disposed in substations which are located throughout the system. In the present case the trolley conductor 16 may be considered as representing one section of the overhead trolley system, and it is energized by a suitable generator 23 which is connected to the trolley conductor 16 through a circuit breaker 24. The circuit breaker 24 is provided with an overload tripping device 25 for automatically opening the circuit breaker in case of an abnormal flow of current.

As explained hereinbefore, the circuit breaker 24 is located in a substation and has sufficient rupturing capacity to interrupt the current under short-circuit conditions, while the breaker 14, which is located on the railway vehicle, is not designed for interrupting a current of the magnitude encountered under short-circuit conditions. Furthermore, as explained hereinbefore, the pantograph 15 must not be lowered from the trolley conductor 16 while carrying abnormal current.

In order to prevent the circuit breaker 14 on the vehicle from attempting to interrupt the power circuit under abnormal conditions, as well as to prevent the pantograph from being lowered while an abnormal current is flowing, an electromagnetic relay 26 is provided. As shown, the relay 26 comprises a core 27 upon which is mounted an operating coil 28 which is energized from a current transformer 29 connected in the circuit for the power transformer 11, and a pivotally mounted armature 31 which carries two sets of contact members 32 and 33. The armature 31 is biased to the open position by a calibrating spring 34.

In addition to the contact members 32 and 33, the relay 26 is provided with auxiliary contact members 35 and 36 which are carried by a pivotally mounted contact arm 37 and are disposed to engage fixed contact members 38 and 39, respectively, when the relay is in the normal or untripped position. The contact arm 37 is retained in the normal position shown in the drawing by a latch arm 41 carried by the armature 31 and is biased to the tripped position by a spring 42. When the contact arm 37 is in the tripped position, the contact members 35 and 36 are disengaged from the contact members 38 and 39, respectively, and the contact member 36 engages a fixed contact member 43.

A manually operable control switch CS is provided to enable the operator of the vehicle to control the operation of the circuit breaker 14 and the lowering of the pantograph 15 under normal operating conditions. The switch CS may be located in the operator's cab in accordance with the usual practice.

In order that the functioning of the foregoing apparatus may be more clearly understood, the operation of the system will now be described in more detail. When the control switch CS and the relay 26 are in the positions shown in the drawing, the actuating coil for the circuit breaker 14 is energized through a circuit which may be traced from positive through a segment 44 of the switch CS, conductor 45, contact members 38 and 35 of the relay 26, conductor 46 and the actuating coil 47 to negative.

At this time the pantograph 15 is raised by the spring 16 since the actuating coil 22 of the magnet valve 21 is deenergized and the valve prevents air from being admitted to the cylinder 18. If the operator desires to open the circuit breaker 14 and lower the pantograph 15, the switch CS is actuated to a position which deenergizes the conductor 45 and energizes a conductor 48. When the conductor 45 is deenergized the actuating coil 47 of the circuit breaker 14 is deenergized thereby opening the circuit breaker. When the conductor 48 is energized, the actuating coil 22 of the magnet valve 21 is energized through a circuit which extends from the conductor 48 through contact members 39 and 36 of the relay 26, a conductor 49, contact members 32 of the relay 26 and the actuating coil 22 to negative. When the coil 22 is energized the magnet valve 21 is operated to admit air to the cylinder 18, thereby lowering the pantograph 15.

In the event of a short circuit in the electrical apparatus, or other condition which causes an abnormal current to flow through the current transformer 29, the current in the coil 28 of the relay 26 causes the armature 31 to be pulled downwardly against the restraining spring 34. The initial movement of the armature 31 interrupts the circuit through the contact members 32 to the coil 22 of the magnet valve 21, thereby preventing energization of the coil 22 to lower the pantograph 15, and establishes a circuit for the closing coil 47 of the breaker 14 through the contact member 33 which is actuated into engagement with a fixed contact member 51. Further travel of the armature disengages the latch arm 41 from the contact arm 37, thereby permitting the contact arm to be actuated to the tripped position by the spring 42.

At this time the circuit to the magnet coil 22 is interrupted by the opening of the contact members 36 and 39 of the relay, thereby preventing the lowering of the pantograph even though the operator actuates the switch CS to the "down" position. Furthermore, the circuit breaker 14 is held closed since its operating coil 47 is kept energized through a circuit which extends from positive through the contact members 51 and 33 of the relay 26, a conductor 52, the contact member 35, conductor 46 and the actuating coil 47 to negative.

When the fault is cleared by the opening of the substation circuit breaker 24, the current in the relay magnet coil 28 is reduced to zero and the armature 31 is biased to the deenergized position by the spring 34. However, the auxiliary contacts 35 and 36 remain in the tripped position.

Under the foregoing conditions, the coil 22 of the magnet valve 21 is energized through a circuit which extends from positive through contact members 43 and 36 of the relay 26, the conductor 49, contact members 32, and the actuating coil 22 to negative. Furthermore, the energizing circuit for the actuating coil 47 of the circuit breaker 14 is interrupted by the disengagement of the contact member 33 from the contact member 51 of the relay 26. In this manner the pantograph 15 is lowered and the circuit breaker 14 is opened after the fault has been cleared by the substation breaker. In order to reestablish normal operation, the relay 26 may be reset manually to restore the auxiliary contacts to the latched position.

With the foregoing system of operation, all abnormal currents are interrupted by the substation breaker or breakers, thereby eliminating the danger of interrupting such currents by the circuit breaker located on the vehicle. Furthermore, the pantograph 15 cannot be lowered while an abnormal current is flowing but is automatically lowered after the fault is cleared, thereby isolating the vehicle to permit the fault to be located and the trouble corrected.

From the foregoing description, it is apparent that I have provided a single relay which combines the features of a pantograph-lowering relay and of a circuit breaker operating relay in one device. Furthermore, the present relay does not have the disadvantage of requiring a time delay device to control the sequence of operation of its contact members which, in the present device, automatically operate in the desired sequence.

Since numerous changes may be made in the above described construction and different embodiments of the invention may be made without departing from the spirit and scope thereof, it is intended that all matter contained in the foregoing description or shown in the accompanying drawing shall be interpreted as illustrative and not in a limiting sense.

I claim as my invention:

1. In a system for controlling the operation of an electric vehicle having a pantograph collector for engaging a trolley conductor, in combination, a load circuit, a circuit breaker for connecting the load circuit to the pantograph, means for lowering the pantograph, manually operable means for normally controlling the operation of said circuit breaker and said pantograph-lowering means, and relay means responsive to the current in said load circuit and having contact members thereon operable in sequential relation for controlling the operation of said circuit breaker and said pantograph-lowering means independently of said manually operable means, the control for the circuit breaker being transferred from one set of said relay contact members to another during the operation of the relay.

2. In a system for controlling the operation of an electric vehicle having a pantograph collector for engaging a trolley conductor, in combination, a load circuit, a circuit breaker for connecting the load circuit to the pantograph, means for lowering the pantograph, manually operable means for normally controlling the operation of said circuit breaker and said pantograph-lowering means, and a relay responsive to the current in said load circuit and having contact members thereon operable in sequential relation for preventing the opening of said circuit breaker and the lowering of said pantograph while the current in the load circuit exceeds a predetermined amount and for causing the opening of the circuit breaker and the lowering of the pantograph after said current is reduced below a predetermined amount, the control for the circuit breaker being transferred from one set of said relay contact members to another during the operation of the relay.

WILLIAM M. HUTCHISON.

REFERENCES CITED

The following references are of record in the file of this patent:

UNITED STATES PATENTS

| Number | Name | Date |
|---|---|---|
| 1,159,936 | Harris | Nov. 9, 1915 |
| 1,654,316 | Wickerham | Dec. 27, 1927 |
| 1,682,432 | Smith | Aug. 28, 1928 |
| 1,794,937 | Wittaker et al. | Mar. 3, 1931 |
| 2,059,064 | Tritle et al. | Oct. 27, 1936 |
| 2,106,844 | Harder et al. | Feb. 1, 1938 |
| 2,289,182 | Dickinson | July 7, 1942 |